United States Patent [19]

Buchanan

[11] 4,205,627

[45] Jun. 3, 1980

[54] ANIMAL CAGE

[76] Inventor: Robert R. Buchanan, 340 Rosewood Ave., San Jose, Calif. 95117

[21] Appl. No.: 868,378

[22] Filed: Jan. 10, 1978

[51] Int. Cl.² ............................................. A01K 1/02
[52] U.S. Cl. ......................................... 119/19; 119/17
[58] Field of Search ...................... 119/15, 16, 17, 18, 119/19, 21, 37, 39

[56] References Cited

U.S. PATENT DOCUMENTS

| | | | |
|---|---|---|---|
| 1,879,580 | 9/1932 | Stoner | 119/16 |
| 3,220,383 | 11/1965 | Bruner | 119/17 |
| 3,237,599 | 3/1966 | Torrey et al. | 119/19 |
| 3,396,702 | 8/1968 | Trussell | 119/17 |
| 3,557,756 | 1/1971 | Ramsey | 119/17 |
| 3,924,571 | 12/1975 | Holman | 119/19 |
| 3,991,717 | 11/1976 | Buchanan | 119/19 |

FOREIGN PATENT DOCUMENTS 1179551  1/1970  United Kingdom .................... 119/15

Primary Examiner—Jay N. Eskovitz
Attorney, Agent, or Firm—David A. Boone

[57] ABSTRACT

Transparent panels form a plurality of enclosures which have inlet and exhaust ventilation openings. The input ventilation openings are coupled to a plenum chamber and the exhaust ventilation openings are coupled to an exhaust chamber. Air flow is maintained from the plenum chamber through the enclosures and out the exhaust chamber by a pressure differential between the plenum chamber and the exhaust chamber. This is accomplished by maintaining the plenum chamber at a positive pressure with respect to the enclosures and maintaining the exhaust chamber at a negative pressure with respect to the enclosures. Air is not recirculated through the cages, and both the input and the exhaust air is sterilized by various devices in the path of the ventilation stream. Cleaning of the enclosures is accomplished by flushing any waste material into the pathway coupling the enclosures with the exhaust chamber. The use of the transparent panels enables various murals to be positioned to give the people who are viewing the animals a feeling of being in a more natural environment. Also, because the enclosures are not air tight, music may be played in the public area which can be heard by the animals in the enclosures.

4 Claims, 3 Drawing Figures

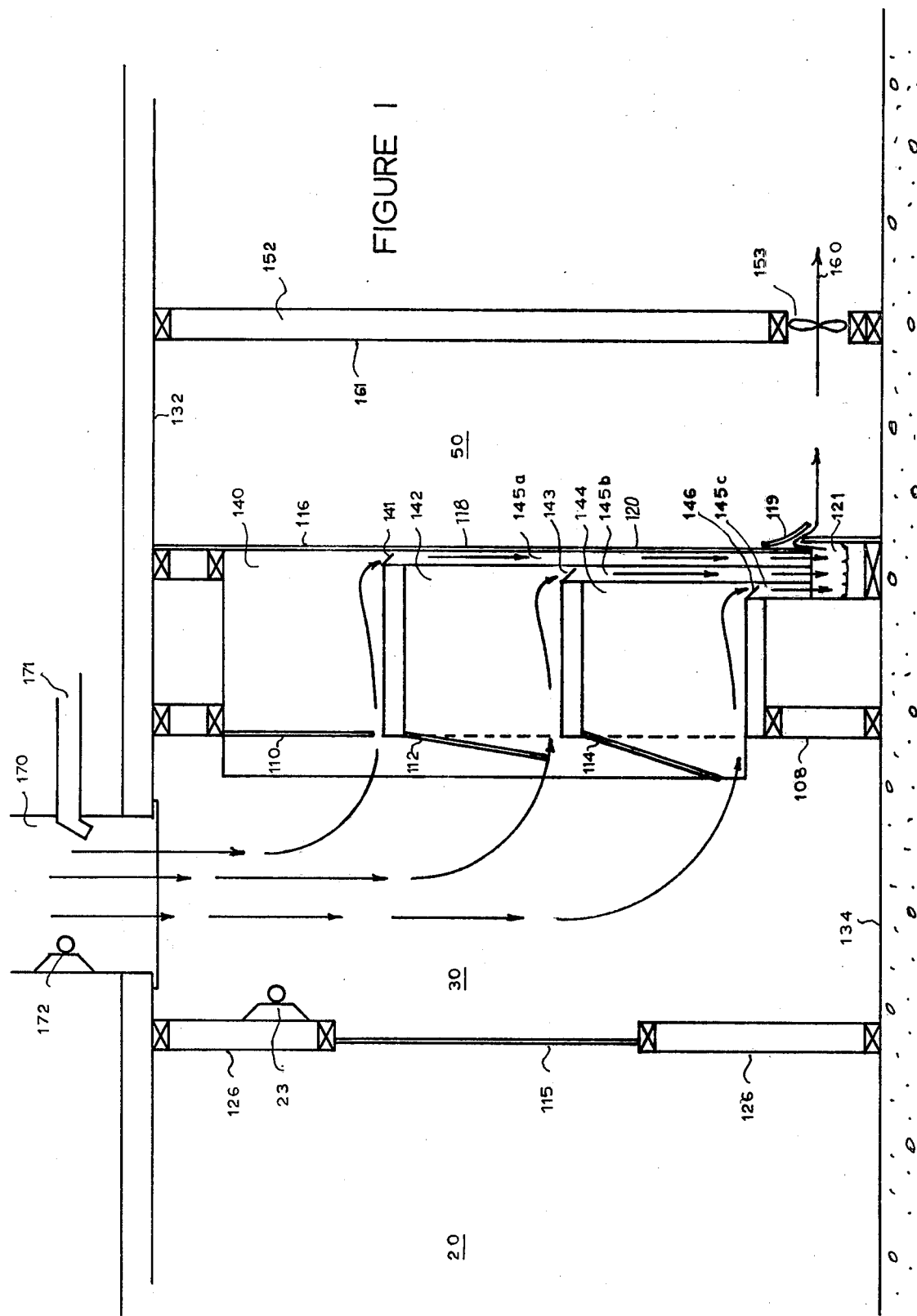

ANIMAL CAGE

BACKGROUND OF THE INVENTION

Several previous attempts have been made to provide a multiple enclosure cage for keeping a plurality of small animals, typically such popular animals as birds, dogs and cats. Veterinarians, pet stores and breeders of these animals had a particular need to contain a large number of animals in a small area.

Other attempts have been made to provide true isolation of animals in multiple enclosures, to deliver bacteria-free and humidity-controlled air to each cage enclosure, and prevent the transfer of disease from one animal to another. Typically, prior attempts have used some form of recirculation of the air through the cages and have used some form of filtering and air purification technique in the path of the air flow. See, for example, U.S. Pat. No. 3,557,756 issued to Thomas J. Ramsey on Jan. 26, 1971 and entitled "Containerized Storing and Shipping Unit for Animals, Birds and Specimens for Biological Study" and also U.S. Pat. No. 3,924,571 to Frank Brouwer Holman on Dec. 9, 1975 and entitled "Animal Caging System".

While previous techniques reduced the bacteria present in the air system, they were not effective in preventing the transfer of virile respiratory infections, e.g., pneumonitis in cats, from one animal to another. Also, provisions for removal of waste from the individual enclosures often contributed to the cross-contamination of the animals.

It is also desirable, particularly when the animals are to be confined for a long period of time, to minimize the trapped or insecure feelings animals have when they are contained in a small place for a prolonged period.

SUMMARY OF THE INVENTION

In accordance with the preferred embodiment of the present invention, transparent panels form a plurality of enclosures having inlet and exhaust ventilation openings. The inlet ventilation openings are coupled to a plenum chamber, while the exhaust ventilation openings are coupled to an exhaust chamber. Air flow is maintained from the plenum chamber through the enclosures to the exhaust chamber by maintaining a pressure differential between the plenum chamber and the exhaust chamber. In the preferred embodiment, the plenum chamber is maintained at a greater pressure with respect to the enclosures while the exhaust chamber is maintained at a lower pressure with respect to the enclosures. Since both the plenum chamber and the exhaust chamber can act independently to provide the necessary pressure differential, entry into the plenum chamber or the exhaust chamber area via doors may be made without disturbing the ventilation system of the preferred embodiment. Furthermore, since the air is not recirculated through the cages, the danger of cross-contamination of diseases such as the virile respiratory diseases which are particularly contagious, is minimized. In addition, the preferred embodiment employs various means to sterilize the input air. Waste removal from each of the enclosures is accomplished by flushing out the waste from the enclosures into a sewage channel which is coupled to the exhaust chamber. A baffle system keeps the waste being removed from flowing into any of the other cages, or interferring with the air flow.

DESCRIPTION OF THE DRAWINGS

FIG. 1 is an end view of a section of enclosures constructed in accordance with the preferred embodiment.

DESCRIPTION OF THE PREFERRED EMBODIMENT

Figure 3:
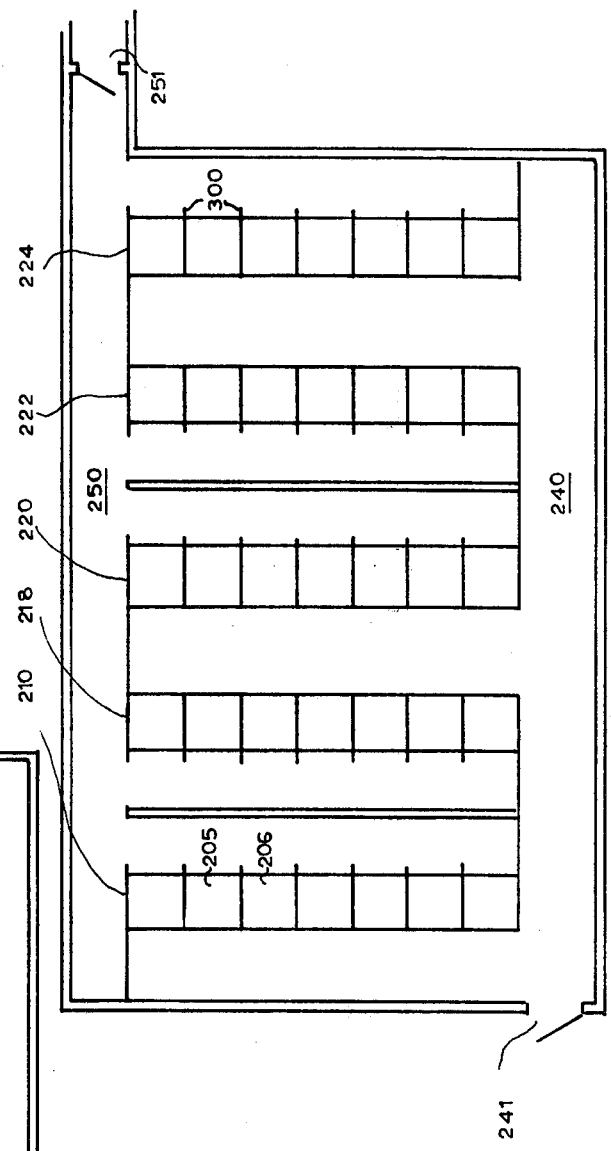
FIG. 3 is a top view of an alternate cage system in accordance with the preferred embodiment.

Referring now to FIG. 1, there is shown an end view of a section of enclosures constructed in accordance with the preferred embodiment. The enclosures comprise transparent panels 110, 112, 114, 116, 118 and 120. A plenum chamber 30 is formed between the surface of wall 108 and transparent panel 110, 112 and 114 and the surface plane formed by wall 126 and transparent panel 115. The plenum chamber enclosure is completed by ceiling 132 and floor 134. An exhaust chamber 50 is formed between the surface plane of transparent panels 116 and baffle 119 and the surface plane formed by wall 152 which contains the exhaust blower 153. Exhaust blower 153 is operated to exhaust air from exhaust chamber 50 in the direction shown by the arrows 160. This in turn causes air to be withdrawn from enclosures 140, 142 and 144 into channels 145a, 145b, 145c, and then into exhaust chamber 50 through baffle 119. In addition, an observation area 20 may be provided to allow visitors to observe the enclosures without making physical contact therewith. Observation area 20 may be separated from the work area 30 by sections of membrane inserted in panel 115 or a portion of panel 115. This membrane would maximize the sound transferable from area 20 to area 30. In this way visitors and animals within the enclosures may hear each other. Also, a mural may be placed on surface 161 of wall 152 to present a more natural looking setting to those viewing the animals within the enclosures.

Simultaneously, blower 170 is inputting fresh air into plenum chamber 30. Since the only outlet from chamber 30 is through the enclosures 140, 142 and 144, air is caused to flow from the plenum chamber through the enclosures and down channels 145a, 145b and 145c and out the exhaust chamber 50. Therefore, the air flow is being maintained through the enclosures through the action of both input blower 170 and exhaust blower 153.

One advantage of this dual blower system is that access can be made to the plenum chamber or the exhaust chamber without disturbing the air flow through the enclosures. A door may be provided to enter plenum chamber 30 and likewise a door may be provided to enter exhaust chamber 50. As long as both the door to plenum chamber 30 and the door to exhaust chamber 50 are not open at the same time, air flow through the enclosures will be maintained. For example, if one opens the door to enter plenum chamber 30 to remove an animal from one of the enclosures or to put a new animal in one of the enclosures, the air being forced into the plenum chamber by blower 170 will tend to flow out the larger door opening rather than through the small ventilation openings in the enclosures. However, since exhaust blower 153 is acting to exhaust the exhaust chamber 50 and assuming that door is not open, the air will still be being drawn from the enclosures, down channels 145a, 145b and 145c and out the exhaust chamber. Of course, if one opened a door to exhaust chamber 50 and hence greatly reduced the negative pressure effect upon the air present in enclosures 140, 142 and 144, there would still be maintained the proper air flow through the enclosures, since the positive pressure in plenum chamber 30 would maintain the flow through the enclosures, down channels 145a, 145b and 145c and into exhaust chamber 50.

To remove the waste buildup in enclosures 140, 142 and 144, one would enter the plenum chamber 30 through the above described access door. The waste material could then be flushed from the cage and into channels 145a, 145b and 145c.

The bottom panels of the enclosures may be sloped toward channels 145 to facilitate the flushing actions. The baffles 141, 143 and 146 would act to prevent any waste material or contaminated air from the cages from contaminating any other enclosure. Once the waste is flushed from the enclosure, further water or antiseptic solution can be used to clean it from channels 145a, 145b and 145c, until it resides in waste channel 121. Once the waste has collected in sewage channel 121, it may be removed from there, or further flushing operations may be made to force it into some appropriate collection receptacle.

Baffles 141, 143, and 146 are, for example, thin strips of metal, rubber, or plastic material which are wider than the channel width and are positioned so that they are at an acute angle with respect to the wall of the channel to which they are attached. These baffles tend to prevent the creation of any undesired flow patterns (e.g. contaminated air from one cage flowing down one channel, then up another channel into a different cage). One way this is accomplished is that the baffles act like a smoke shelf in a fireplace and cause any reverse flow pattern to be reflected back in the desired direction. Also, upward air flow in the channels tends to cause the baffles to restrict the opening in the channels since upward movement of the free end of the baffles acts to restrict or close the channel opening.

Figure 2:
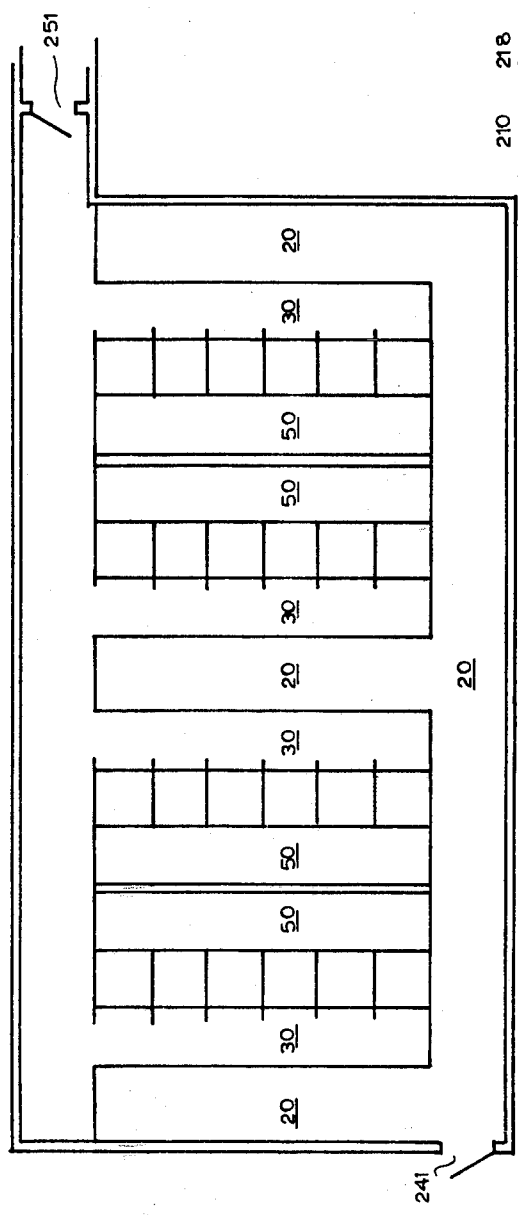
FIG. 2 is a top view of an enclosure system similar to that shown in FIG. 1.

In order to provide the most sterile environment possible, several additional techniques may be employed to prevent any input of infectious organisms via input blower 170. For example, short wave, ultraviolet lights 172 may be provided in the input path of blower 170. In addition, an antiseptic solution may be input into the plenum chamber through a vaporizer 171 or some like apparatus. An overview of the cage system of FIG. 1 is shown in FIG. 2.

When removing a diseased animal or when introducing any new animal to the cage system, there is the possibility that the air in plenum chamber 30 will become contaminated as the animal is transported through the plenum chamber to and/or from its cage. Therefore, the following procedure is used when the cage is to be opened. Both input blower 170 and exhaust blower 153 are turned off and the required transfer to or from the cage is made. Once this is accomplished and the cages are all closed, the ultraviolet light 23 is turned on for a predetermined time before the blowers are again turned on. In this way, the contaminated air in the plenum chamber 30 may be cleansed before passing through the cages.

Referring now to FIG. 3, there is shown a top view of an alternate cage system in accordance with the preferred embodiment. Groups of enclosures such as enclosure 205 and 206 are arranged in banks, e.g., banks 210, 218, 220, 222 and 224.

In the configuration shown in FIG. 3, two separate areas are formed on either side of the enclosures, basically areas 240 and 250. Access to these areas is through passageways indicated by arrows 241 and 251, respectively. To ensure that proper airflow is maintained in a large system, it would be desirable to provide air locks in at least one of the passageways. To ensure that the desired air pressure and airflow is maintained in both areas, an air lock should be placed in the path of both passageways 241 and 251.

In the system shown in FIG. 3, access through passageway 241 could be reserved for public access to the front of the enclosures. Such a system would be appropriate in a humane animal shelter, a large veterinary hospital, or pet store. This area 240 is, of course, analogous to the observation area 20 as shown in FIG. 1. Persons in area 240 would be able to clearly see the animals in the enclosures and also, assuming the rear panels were of clear material, would be able to see a mural or other artwork present on dividing walls 152. Using a natural wild-life mural on walls 152 serves two purposes. Not only does it make the animals feed more at ease to see some familiar surroundings, but also the animals look more comfortable and attractive to their owners or prospective owners. Area 250 is analogous to the plenum chamber 30 which was described with respect to FIG. 1. The system described with respect to FIG. 3 is different from that shown in FIGS. 1 and 2 in that there is no exhaust chamber area. Air is exhausted to the outside directly from ducts 145a, 146b and 145c. While this is simpler in construction, it has the disadvantage that members of the public may tap directly on the cages and annoy the animals, as well as deface the cage panels. Splash guards are provided such as splash guards 300 to prevent contaminated clean up water, air, and the breath from the animals in one cage from reaching and infecting the animals in the adjacent cage.

I claim:
1. A cage system comprising:
a plenum chamber;
means coupled to the plenum chamber for causing the input of air thereto;
an exhaust chamber;
means coupled to the exhaust chamber for causing the removal of air therefrom;
a plurality of enclosures, each one of said enclosures being coupled to said plenum chamber by an inlet port and to the exhaust chamber by an exhaust port;
an access door in said plenum chamber and an access door in said exhaust chamber;
said enclosures including a transparent front panel which when in the closed position, forms a slotted opening which comprises the inlet port;
the exhaust ports of enclosures including a baffle system to prevent any waste material and exhaust air from an enclosure from entering any other enclosures;
a waste removal channel operably disposed to receive waste material flushed from said enclosures via said exhaust port;
a splash guard barrier extending out from and located between said cages for preventing the transfer of contaminated air and water therebetween; and
a partition separating said plenum chamber from an observation area, said partition includes a transparent panel and a membrane panel whereby events occurring on one side of said partition may be both seen and heard on the other side of the partition.

2. The cage system as in claim 1 and further comprising means for providing a preselected agent into the air within said cage system.

3. The cage system as in claim 2 and further comprising means for providing ultra-violet light into preselected portions of said cage system.

4. The cage system as in claim 2 and further comprising light means for providing ultra-violet light into preselected portions of said cage systems; and switch means for causing said means coupled to the plenum chamber for causing the input of air thereto and said means coupled to the exhaust chamber for causing the removal of air therefrom to be inoperative for a preselected time after the light means provides said ultra-violet light into said preselected portions of the cage system, thereby ensuring that contamination of air in the plenum chamber such as during transfer of a diseased animal has been eliminated by the ultraviolet light before the plenum chamber air is drawn through said enclosures.

* * * * *